United States Patent [19]

Sackmann et al.

[11] Patent Number: 4,670,516
[45] Date of Patent: Jun. 2, 1987

[54] COPOLYMERS BASED ON MALEIC ANHYDRIDE AND α, β-UNSATURATED COMPOUNDS A PROCESS FOR THEIR PREPARATION AND THEIR USE AS PARAFFIN INHIBITORS

[75] Inventors: Günter Sackmann, Leverkusen; Jan Mazanek, Cologne; Wolfgang Oberkirch, Leverkusen; Herbert Bartl, Odenthal, all of Fed. Rep. of Germany

[73] Assignee: Bayer Aktiengesellschaft, Leverkusen, Fed. Rep. of Germany

[21] Appl. No.: 700,411

[22] Filed: Feb. 11, 1985

[30] Foreign Application Priority Data

Feb. 17, 1984 [DE] Fed. Rep. of Germany ....... 3405843

[51] Int. Cl.$^4$ ................................................. C08F 8/32
[52] U.S. Cl. ........................... 525/327.6; 525/327.7; 525/359.1; 525/380; 525/382
[58] Field of Search ........................... 525/327.6, 327.7

[56] References Cited

U.S. PATENT DOCUMENTS

| 3,933,761 | 1/1976 | Coleman | 525/327.6 |
| 4,126,738 | 11/1978 | Gaylord | 525/327.6 |
| 4,187,364 | 2/1980 | Darms et al. | 525/327.6 |
| 4,511,369 | 4/1985 | Denis et al. | 525/327.6 |

FOREIGN PATENT DOCUMENTS 878926 10/1961 United Kingdom .

OTHER PUBLICATIONS

Chemical Abstracts, vol. 88, No. 16, Apr. 17, 1978, p. 30, Nr. 106208f, Columbus, Ohio, USA, & JP-A-77136 290, Kansai Paint Co. Ltd.

Primary Examiner—Joseph L. Schofer
Assistant Examiner—Bernard Lipman
Attorney, Agent, or Firm—Sprung Horn Kramer & Woods

[57] ABSTRACT

The new copolymers based on maleic anhydride and α,β-unsaturated compounds contain, as bivalent structural units, A: 20 to 95 mole % of the structural element

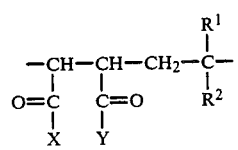

B: 0 to 40 mole % of the structural element

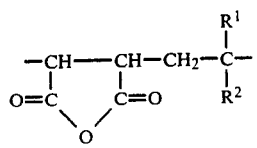

C: and 0 to 40 mole % of the structural element

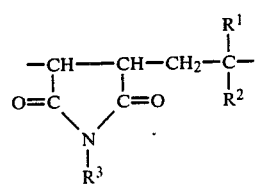

the sum of the mole percents of (A), (B) and (C) being 100, and
wherein $R^1$ and $R^2$ are identical or different and denote hydrogen, alkyl, optionally substituted aryl or the ester group

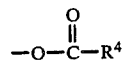

in which
$R^4$ represents alkyl with 1 to 20 carbon atoms,
$R^3$ denotes an alkyl, cycloalkyl or optionally substituted aryl radical with 1 to 20 carbon atoms and
X and Y are identical or different and represent the group

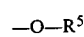

in which
$R^5$ denotes hydrogen, a cation or alkyl with 1 to 40 carbon atoms, or
X and Y represent the group

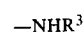

in which $R^3$ has the abovementioned meaning,
at least one of the radicals X and Y representing the group —O—$R^5$, and at least one of the radicals in the radicals X and Y containing at least 18 carbon atoms.

The new copolymers can be prepared by reacting alternating copolymers of maleic anhydride and α,β-unsaturated compounds with monoalcohols and monoamines. They can be used as paraffin inhibitors.

16 Claims, No Drawings

COPOLYMERS BASED ON MALEIC ANHYDRIDE AND α, β-UNSATURATED COMPOUNDS A PROCESS FOR THEIR PREPARATION AND THEIR USE AS PARAFFIN INHIBITORS

The invention relates to copolymers based on maleic anhydride and α,β-unsaturated compounds, a process for their preparation and their use as paraffin inhibitors in crude oils, residual oils and other paraffin-containing mixtures.

Mineral oils as a rule have a content of undissolved n-paraffins which crystallize out when the temperature is reduced and can thereby lead to deterioration in the flow properties of these oils. On transportation through pipelines, this can lead to deposits on the wall, and in particular cases (for example of a pipeline is idle) even to complete blockage. Precipitation of paraffins can also lead to complications in the storage and further processing of the oil.

Apart from the conventional methods of eliminating this paraffin problem (by heat, mechanically or with solvents), which are based merely on the removal of the precipitates already formed, a number of chemical additives (paraffin inhibitors) have been developed in the last few years, which, by physical interaction with the paraffin crystals which precipitate, lead to modifications in their shape, size and adhesion properties. The additives act here as additional crystal nuclei and partly crystallize out with the paraffins; part of their action is also explained by dispersion of the crystals. The modified crystals tend to form fewer deposits, and are also smaller and have a different crystal shape. Oils treated with additives can even be pumped or processed at temperatures which are frequently more than 20° C. below those for oils which do not contain these additives.

Some copolymers based on maleic anhydride and α,β-unsaturated compounds are known as paraffin inhibitors for crude oils. Thus, Canadian Patent Specification No. 932,093 describes reaction products of long-chain alcohols with copolymers of maleic anhydride and α,β-unsaturated compounds, and U.S. Pat. No. 3,879,177 describes copolymers of maleic anhydride with vinyl esters or vinyl ethers, these products being used as paraffin inhibitors. U.S. Pat. No. 3,574,575 describes the use of reaction products of copolymers of maleic anhydride/styrene with behenyl alcohol as paraffin inhibitors for crude oils.

However, the paraffin-inhibiting effect of the known paraffin inhibitors is not adequate, so that precipitation of paraffins and waxes occurs, especially at low temperatures. Another disadvantage is that the applicability of certain known paraffin inhibitors is restricted to only certain crude oils.

New copolymers based on maleic anhydride and α,β-unsaturated compounds have been found, which are characterized in that they contain, as bivalent structural units, A. 20 to 95 mole% of the structural element

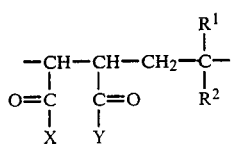

B. 0 to 40 mole% of the structural element

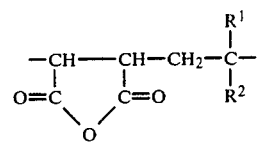

(I)

c. and 0 to 40 mole% of the structural element

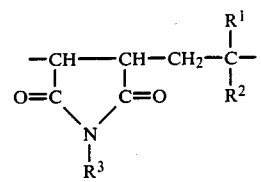

the sum of the mole percents of (A), (B) and (C) being 100, and wherein, $R^1$ and $R^2$ are identical or different and denote hydrogen, alkyl, optionally substituted aryl or the ester group

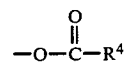

in which
$R^4$ represents alkyl with 1 to 20 carbon atoms,
$R^3$ denotes an alkyl, cycloalkyl or optionally substituted aryl radical with 1 to 20 carbon atoms and
X and Y are identical or different and represent the group

in which
$R^5$ denotes hydrogen, a cation or alkyl with 1 to 40 carbon atoms, or
X and Y represent the group

in which $R^3$ has the abovementioned meaning,
at least one of the radicals X and Y representing the group $—O—R^5$, and at least one of the radicals in the radicals X and Y containing at least 18 carbon atoms.

The new copolymers according to the invention comprise the structural elements A, B and C. They also contain, in a manner which is known per se, only the end groups formed by initiation and chain-stopping during the polymerization.

According to the invention, alkyl ($R^1$ and $R^2$) in general represents a straight-chain or branched hydrocarbon radical with 1 to 12 carbon atoms. A lower alkyl radical with 1 to about 6 carbon atoms is preferred. The following alkyl radicals may be mentioned as examples: methyl, ethyl, propyl, isopropyl, butyl, isobutyl, pentyl, isopentyl, hexyl and isohexyl.

According to the invention, alkyl ($R^3$ and $R^4$) in general represents a straight-chain or branched hydrocarbon radical with 1 to 20, preferably 1 to 18, carbon atoms. The following alkyl radicals may be mentioned specifically: n-hexyl, n-octyl, cyclohexyl, dodecyl, tetradecyl, hexadecyl, and octadecyl. In particular, $R^4$ can represent methyl, propyl or heptadecyl.

According to the invention, alkyl ($R^5$) in general represents a straight-chain or branched hydrocarbon radical with 1 to 40, preferably 14 to 40, carbon atoms. The following alkyl radicals may be mentioned as examples: tetradecyl, hexadecyl, octadecyl, eicosyl and behenyl.

According to the invention, aryl ($R^1$, $R^2$ and $R^3$) represents an aromatic radical with 6 to 12 carbon atoms. The phenyl and naphthyl radical may be mentioned as examples. The phenyl radical is preferred.

Substituents of the aryl radicals can be, for example, lower alkyl ($C_1$ to about $C_6$), halogen, such as fluorine, chlorine, bromine and iodine, preferably chlorine, and alkoxy ($C_1$ to about $C_6$).

According to the invention, cycloalkyl ($R^3$) in general represents a cyclic aliphatic radical with 1 to 20 carbon atoms. Preferred cycloalkyl radicals are cyclopentyl and cyclohexyl.

According to the invention, a cation denotes an alkali metal (in particular sodium and potassium) or an ammonium cation.

Preferred copolymers according to the invention contain, as bivalent structural units, A. 60 to 95 mole% of the structural element

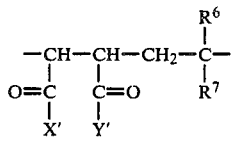

B. 0 to 25 mole% of the structural element

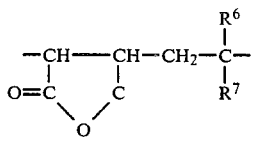

C. and 2 to 20 mole% of the structural element

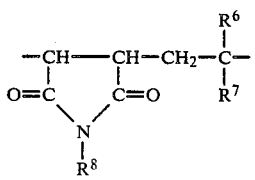

the sum of the mole percent of (A), (B) and (C) being 100, and wherein $R^6$ and $R^7$ are identical or different and denote hydrogen, lower alkyl, optionally substituted phenyl or the ester group

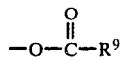

in which $R^9$ represents alkyl with 1 to 18 carbon atoms, $R^8$ denotes an alkyl radical with 1 to 20 carbon atoms, cyclopentyl, cyclohexyl or phenyl, and X' and Y' are identical or different and represent the group

in which $R^{10}$ denotes hydrogen or alkyl with 1 to 40 carbon atoms, or

X' and Y' represent the group $-NHR^8$ in which $R^8$ has the abovementioned meaning, at least one of the radicals X' and Y' representing the group $-OR^{10}$, and at least one of the radicals in the radicals X' and Y' containing at least 18 carbon atoms.

The following compounds listed in the two Tables may be mentioned as examples. Those products which are based on maleic anhydride/styrene copolymers are listed in the first Table, whilst in the second Table, maleic anhydride/ethylene copolymers serve as the starting copolymers for the compounds according to the invention. The structural elements A, B and C here in each case correspond to those mentioned in the formula (I). + here denotes that the structural element is present; - denotes that the structural element is absent.

TABLE 1

| Product No. | Structural element A X | Y | B | C $R^3$ |
|---|---|---|---|---|
| 1 | $-O(C_{18}H_{37}bisC_{22}H_{45})$ | $-OH$ | + | — |
| 2 | $-OC_{22}H_{45}$ | $-OH$ | + | — |
| 3 | $-OC_{22}H_{45}$ | $-O^{(-)}\overset{\oplus}{N}(C_2H_5)_3 \atop H$ | + | — |
| 4 | $-OC_{22}H_{45}$ | $-OH$ | + | $-C_{18}H_{37}$ |
| 5 | $-O(C_{18}H_{37}-C_{22}H_{45})$ | $-O(C_{18}H_{37}-C_{22}H_{45})$ | + | — |
| 6 | $-O(C_{18}H_{37}-C_{22}H_{45})$ | $-O(C_{18}H_{37}-C_{22}H_{45})$ | − | $-C_{18}H_{37}$ |
| 7 | $-O(C_{18}H_{37}-C_{22}H_{45})$ | $-O(C_{18}H_{37}-C_{22}H_{45})$ | − | $-C_{18}H_{37}$ |
| 8 | $-O(C_{18}H_{37}-C_{22}H_{45})$ | $-O(C_{18}H_{37}-C_{22}H_{45})$ | + | — |
| 9 | $-O(C_{18}H_{37}-C_{22}H_{45})$ | $-O(C_{18}H_{37}-C_{22}H_{45})$ | + | $-C_{18}H_{37}$ |

| Product No. | Structural element A X | Y | B | C $R^3$ |
|---|---|---|---|---|
| 1 | $-O(C_{18}H_{37}-C_{22}H_{45})$ | $-OH$ | + | — |
| 2 | $-O(C_{22}H_{45})$ | $-OH$ | + | — |
| 3 | $-O(C_{18}H_{37}-C_{22}H_{45})$ | $-OH$ | + | $-C_{18}H_{37}$ |
| 4 | $-O(C_{22}H_{45})$ | $-OH$ | + | $-C_{18}H_{37}$ |
| 5 | $-O(C_{18}H_{37}-C_{22}H_{45})$ | $-O(C_{18}H_{37}-C_{22}H_{45})$ | + | — |
| 6 | $-O(C_{18}H_{37}-C_{22}H_{45})$ | $-O(C_{18}H_{37}-C_{22}H_{45})$ | + | $-C_{18}H_{37}$ |
| 7 | $-O(C_{18}H_{37}-C_{22}H_{45})$ | $-O(C_{18}H_{37}-C_{22}H_{45})$ | − | $-C_{18}H_{37}$ |
| 8 | $-O(C_{18}H_{37}-C_{22}H_{45})$ | $-O(C_{18}H_{37}-C_{22}H_{45})$ | + | $-C_{18}H_{37}$ |

The copolymers according to the invention have a limiting viscosity number [η] of 0.10 to 3.0 [−dL/g], corresponding to average molecular weights of between about 3,000 and about 3,000,000.

A process has also been found for the preparation of the copolymers according to the invention based on maleic anhydride and α,β-unsaturated compounds, characterized in that an alternating copolymer with the structural element

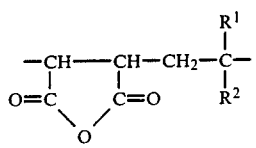 (III)

in which $R^1$ and $R^2$ are identical or different and denote hydrogen, alkyl, optionally substituted aryl or the ester group

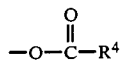

in which $R^4$ represents alkyl with 1 to 20 carbon atoms, is reacted with a primary monoalkylamine of the formula $R^3$—$NH_2$ (IV)

in which $R^3$ denotes an alkyl or cycloalkyl radical with 1 to 20 carbon atoms,
and one or more alcohols of the formula $R^{10}$—OH (V)

in which $R^{10}$ denotes alkyl with 1 to 40 carbon atoms, in the temperature range from 80° to 180° C. and, if appropriate, the product is neutralized with a base.

Alternating copolymers of maleic anhydride and α,β-unsaturated compounds are known per se (Vollmert, Grundriss der Makromolekularen Chemie (Basic principles of macromolecular chemistry); Springer-Verlag, Berlin 1962).

α,β-Unsaturated compounds in the context of the present invention are in general compounds of the formula

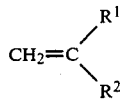 (VI)

in which $R^1$ and $R^2$ have the abovementioned meaning.

The following α,β-unsaturated compounds may be mentioned as examples: ethylene, propylene, isobutylene, diisobutylene, styrene, α-methylstyrene and p-methylstyrene.

The alternating copolymers can be prepared, for example, by copolymerizing maleic anhydride with the abovementioned α,β-unsaturated compounds in a molar ratio of 1:10 to 10:1, preferably 1:2 to 2:1, using free radical initiators.

The following primary amines may be mentioned as examples: n-butylamine, n-hexylamine, n-octylamine, n-dodecylamine and n-stearylamine, and also N,N-dimethylaminopropylenediamine, cyclohexylamine, dehydroabietylamine and aniline.

In the context of the present invention, shorter and longer-chain alcohols ($C_1$–$C_{40}$) and mixtures of longer- and shorter-chain monoalcohols are used. Alcohols of this type are known per se.

Examples of shorter-chain alcohols which may be mentioned are n-butanol, n-hexanol, n-octanol and n-dodecanol, and longer-chain alcohols which may be mentioned are stearyl alcohol, behenyl alcohol and the monoalcohols, known as alfoles, with a carbon chain length of up to 40 C atoms.

The content of the individual structural elements in the copolymer according to the invention is essentially determined by the proportions of the reactants.

According to the invention, 0.02 to 0.4 mole, preferably 0.02 to 0.2 mole, of the primary monoalkylamine is in general employed per mole of the alternating copolymer.

According to the invention, 1.0 to 2.0 moles, preferably 1.5 to 2.0 moles, of the alcohol are in general employed per mole of the alternating copolymer.

It is also possible to use one or more alcohols in the process according to this invention. Thus, it is possible to use a shorter-chain ($C_1$–$C_{12}$) and a longer-chain ($C_{18}$–$C_{40}$) monoalcohol for the process according to the invention. It is also possible to use, for the process according to the invention, mixtures of different long-chain alcohols, such as are obtained in industry.

The process according to the invention is in general carried out in solution, suspension or a melt.

Solvents for the process according to the invention are inert solvents which are not modified under the conditions according to the invention. Examples of solvents which may be mentioned are: toluene, xylene and higher-boiling aliphatic hydrocarbons.

The process according to the invention is in general carried out in the temperature range from 80° to 180° C., preferably from 80° to 140° C.

The process according to the invention is in general carried out under normal pressure (1,000 mbar). However, it is also possible to carry out the process under an increased or reduced pressure (for example in the pressure range from 0.1 to 20 bar).

The process according to the invention is in general carried out under an inert gas. Examples of inert gases which may be mentioned are nitrogen, helium and argon.

In carrying out the process according to the invention, the reaction of the alternating copolymer of maleic anhydride and the α,β-unsaturated compounds with the aliphatic monoalcohols to give the half- or bis-esters is most advantageously carried out first. The degree of reaction of the anhydride groups with the monoalcohols is between 60 and 95 mole%. The anhydride groups which have not reacted with the monoalcohols are then reacted either completely or partly, to give cyclic imides, with the primary aliphatic monoamines.

If only partial imidation is carried out, free anhydride groups still remain in the copolymer molecule.

If, besides the bis-ester structures, the copolymer according to the invention also still contains half-ester groupings, together with free carboxyl groups, these can be neutralised by reaction with a base to form a salt.

According to the invention, bases here are in general the alkali metal hydroxides (preferably sodium hydroxide and potassium hydroxide) and ammonium hydroxide.

The copolymers according to the invention are most advantageously prepared by a procedure in which the reaction with the monoalcohols is first carried out in solution, suspension or a melt to give the half- or bis-esters. Catalysts, in general acids, such as sulphuric acid or p-toluenesulphonic acid, can be added to accelerate the bis-esterification, which takes place under dehydration. To remove the water of reaction, the reaction is preferably carried out using a water-immiscible solvent, such as, for example, toluene or xylene, either in suspension or solution, and the water of reaction is distilled azeotropically. If the copolymer to be reacted is insoluble in the solvent at the start of the reaction, it dissolves as the degree of esterification increases, to form a clear solution when the reaction has ended.

The preferred temperature range for the formation of the half- or bis-esters is from 60° to 180° C, preferably from 80° to 140° C.

After the esterification reaction, the imidation is preferably carried out in the same solvent with primary aliphatic monoamines in the temperature range from 100° to 180° C., preferably from 110° to 150° C., the water of reaction likewise being removed azeotropically.

However, it is also possible to carry out the imidation reaction at the same time as or before the esterification reaction. In the case of simultaneous esterification and imidation, the starting copolymer is reacted with a mixture of monoalcohols and monoamines.

In one variant of the process according to the invention, it is possible, apart from polymer-analogous reaction on the alternating copolymer of maleic anhydride and $\alpha,\beta$-unsaturated compound, also to prepare products, according to the invention by direct copolymerisation of $\alpha,\beta$-unsaturated compounds, such as, for example, ethylene, isobutylene, diisobutylene or styrene, with the corresponding half- or bis-esters of maleic acid or the maleimides. This reaction can likewise be carried out in solution or suspension or in bulk.

The new copolymers according to the invention are particularly suitable as paraffin inhibitors for paraffin-containing mineral oil products with a content of paraffins, waxes, bituminized resins and the like. Examples which may be mentioned of paraffin-containing mineral oil products in the context of the invention are crude oils, distillation residues from the refining of mineral oil or other paraffin-containing oils (compare, for example, Compositions and Properties of Petroleum, F. Enke publishers, Stuttgart 1981, pages 1 to 37).

Paraffins here can be straight-chain or branched alkanes with about 10 to 50 carbon atoms.

The compounds according to the invention have a very broad effectiveness in mineral oil products of different origin and are thus universally applicable.

The concentrations in which the paraffin inhibitors according to the invention are used are in general 10 to 10,000 ppm, preferably 20 to 5,000 ppm and particularly preferably 50 to 1,000 ppm, in the mineral oil product.

The optimum use concentration for a particular paraffin-containing oil can in each case be ascertained, for example, by a pour point determination.

For example, in the case of crude oils, the paraffin inhibitors according to the invention can be added either in the well hole or during transportation, storage or further processing.

The invention also relates to the mineral oil products stabilized against paraffin deposits by the paraffin inhibitors according to the invention.

The compounds according to the invention improve the low temperature properties of these oils and thus give rise to improved flow properties compared with the prior art. In particular, the pour point and viscosity are improved.

The improvement in the flow properties can be measured, for example, by determination of the pour point in accordance with ASTM standard No. 97 B (section 6f) by measurement of the amount of paraffin deposited and by viscosity measurements. The former method, in particular, is a method which is widely used in practice and, in screening studies, is in most cases adapted to practical operating conditions (for example addition of the additive at 50° C. (actual pour point)).

PREPARATION EXAMPLE 1

101 g of an alternating copolymer of maleic anhydride and styrene with a limiting viscosity number [n] of 1.48 (dl/g), measured in dimthylformamide, and 163 g of an aliphatic monoalcohol consisting of behenyl alcohol to the extent of 98% by weight are introduced into a 2 liter 3-necked flask with a stirrer, reflux condenser and nitrogen inlet and outlet and are heated at 120° C. for 24 hours, with stirring. The resulting viscous melt is then dissolved in 616 g of xylene.

64.5 g of stearylamine are now added to this solution, the mixture is heated to the reflux temperature and the water of reaction formed is removed azeotropically from the reaction mixture via a water separator. When no further water passes over, the solution is cooled and decanted.

Characterisation by IR spectroscopy shows a copolymer containing about 47–49 mole% of half-ester groupings, about 3–5 mole% of anhydride groupings and about 45–47 mole% of imide structures.

PREPARATION EXAMPLE 2

101 g of an alternating copolymer of maleic anhydride and styrene with a limiting viscosity number [$\eta$] of 0.462 (dL/g), measured in dimethylformamide, and 163 g of a linear aliphatic monoalcohol mixture consisting of behenyl alcohol to the extent of more than 70% and of stearyl alcohol and eicosanol to the extent of in each case 15%, are suspended in 268 g of xylene in a 3-necked flask under a weak stream of $N_2$. On heating to 120° C., the suspension gradually changes into a clear solution, and the half-ester formation has ended after 24 hours at the latest. A further 163 g of the abovementioned alcohol mixture and 2.5 g of p-toluenesulphonic acid are then added and the mixture is heated to the reflux temperature. It is stirred at this temperature until about 9 ml of water of reaction have been separated off via a water separator. The resulting clear solution contains a polymer which, on the basis of IR analysis, contains up to about 95 mole% of bis-ester groups and up to about 5 mole% of anhydride groups.

PREPARATION EXAMPLE 3

225 g of the copolymer solution obtained according to Preparation example 2 are diluted with 50 g of xylene, and 4.38 g of stearylamine are then added. This reaction mixture is likewise kept at its reflux temperature until no further water is split off.

After cooling, a solution of a copolymer which contains up to 85–88 mole% of bis-ester groups, up to 1–2 mole% of anhydride groups and up to about 10 mole% of imide groups is obtained.

PREPARATION EXAMPLE 4

63 g of an alternating copolymer of maleic anhydride and ethylene with an average molecular weight of 8,000 are treated with 244.5 g of an aliphatic monoalcohol mixture containing more than 70% of behenyl alcohol for 24 hours, with stirring. The resulting melt is then dissolved in 460 g of xylene and, after addition of 1.4 g of p-toluenesulphonic acid, the water of reaction is split off under reflux conditions and removed azeotropically from the reaction mixture for a further 24 hours.

16.2 g of stearylamine are now added to 300 g of this solution and the mixture is kept at the reflux temperature until no further water is split off.

The solution obtained in this manner contains a copolymer with a content of about 68 mole% of bis-ester groups, about 2 mole% of anhydride groups and about 30 mole% of imide groups.

PREPARATION EXAMPLE 5

63 g of a copolymer of maleic anhydride and ethylene with an average molecular weight of 25,000 are heated at 120° C. with 163 g of behenyl alcohol of 98% purity for 24 hours. The homogeneous mixture thereby formed is dissolved in 527 g of xylene.

16.88 g of stearylamine are added to 188.3 g of such a solution and the mixture is heated under reflux conditions until no further water of reaction is split off.

On the basis of investigations by IR spectroscopy, the resulting clear solution has a content of about 45 mole% of ester groups, about 50 mole% of imide groups and about 5 mole% of anhydride groups.

PREPARATION EXAMPLE 6

A reaction mixture consisting of 101 g of an alternating copolymer of maleic anhydride and styrene with a limiting viscosity number [η] of 0.462 (dL/g), measured in dimethylformamide, 268 g of xylene, 326 g of an aliphatic monoalcohol consisting of behenyl alcohol to the extent of 98% by weight, and 2.5 g of p-toluenesulphonic acid are heated to the reflux temperature in a 3-necked flask under a weak stream of nitrogen and is stirred until about 9 ml of water of reaction have not been separated off. 50 g of xylene and 14.38 g of stearyl-amine are added to 225 g of the resulting clear solution and the reaction mixture is stirred at its reflux temperature until no further water is separated off. After cooling, the solution of a copolymer containing up to about 84–87 mole% of bis-ester groups, up to about 1–2 mole% of anhydride groups and up to about 11–12 mole% of imide groups is obtained.

USE EXAMPLES

Tables 3 and 4 which follow show the chemical build-up of the copolymers characterized by the structural elements

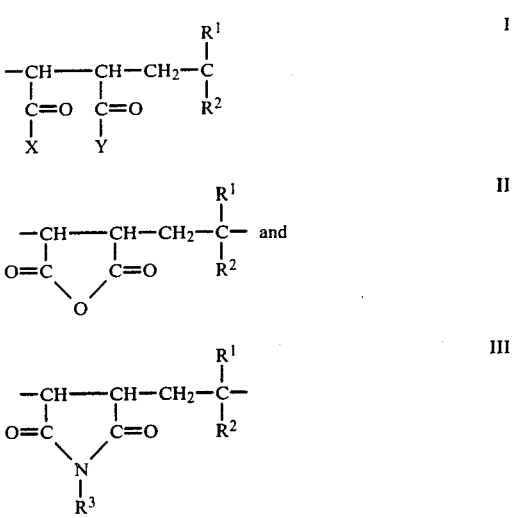

which were added as paraffin inhibitors to crude oils of various origin in Use examples 1–4 (see Tables 5–8).

+ here denotes that the structural element is present,
− denotes that it is absent.

In Table 3, $R^1$ represents hydrogen and $R^2$ represents phenyl. In Table 4, $R^1$ and $R^2$ represent hydrogen.

TABLE 3

This Table shows the chemical build-up of 9 copolymers based on maleic anhydride/styrene copolymers, products 1–6 being prepared from starting copolymers with a [η] value of 1.48 (dL/g) and products 7–9 being prepared from starting copolymers with a [η] value of 0.461 (dL/g).

TABLE 3

| Product No. | Structural elements I X | Y | II | III $R_3$ | Composition Mol % I | II | III |
|---|---|---|---|---|---|---|---|
| 1 | —O(C$_{18}$H$_{37}$—C$_{22}$H$_{45}$) | —OH | + | — | 75 | 25 | 0 |
| 2 | —OC$_{22}$H$_{45}$ | —OH | + | — | 75 | 25 | 0 |
| 3 | —OC$_{22}$H$_{45}$ | —O$^\ominus$N(C$_2$H$_5$)$_3$ H | + | — | 80 | 20 | 0 |
| 4 | —OC$_{22}$H$_{45}$ | —OH | + | —C$_{18}$H$_{37}$ | 47–49 | 3–5 | 45–47 |
| 5 | —O(C$_{18}$H$_{37}$—C$_{22}$H$_{45}$) | —O(C$_{18}$H$_{37}$—C$_{22}$H$_{45}$) | + | — | 90 | 10 | 0 |
| 6 | —O(C$_{18}$H$_{37}$—C$_{22}$H$_{45}$) | —O(C$_{18}$H$_{37}$—C$_{22}$H$_{45}$) | − | —C$_{18}$H$_{37}$ | 90 | 0 | 10 |
| 7 | —O(C$_{18}$H$_{37}$—C$_{22}$H$_{45}$) | —O(C$_{18}$H$_{37}$—C$_{22}$H$_{45}$) | − | —C$_{18}$H$_{37}$ | 92 | 0 | 8 |
| 8 | —O(C$_{18}$H$_{37}$—C$_{22}$H$_{45}$) | —O(C$_{18}$H$_{37}$—C$_{22}$H$_{45}$) | + | — | 95 | 5 | 0 |
| 9 | —O(C$_{18}$H$_{37}$—C$_{22}$H$_{45}$) | —O(C$_{18}$H$_{37}$—C$_{22}$H$_{45}$) | + | —C$_{18}$H$_{37}$ | 85–88 | 1–2 | ca. 10 |

TABLE 4

This Table shows the chemical build-up of 7 copolymers based on ethylene/maleic anhydride copolymers, products 1, 2, 5, 6 and 7 being prepared from starting copolymers with an average molecular weight of 8,000, and products 3 and 4 being prepared from starting copolymers with an average molecular weight of 25,000.

TABLE 4

| Product No. | Structural elements I X | Y | II | III $R^3$ | Composition mole % I | II | III |
|---|---|---|---|---|---|---|---|
| 1 | —O($C_{18}H_{37}$—$C_{22}H_{45}$) | —OH | + | — | 75 | 25 | 0 |
| 2 | —O($C_{22}H_{45}$) | —OH | + | — | 75 | 25 | 0 |
| 3 | —O($C_{18}H_{37}$—$C_{22}H_{45}$) | —OH | + | —$C_{18}H_{37}$ | 45 | 5 | 50 |
| 4 | —O($C_{22}H_{45}$) | —OH | + | —$C_{18}H_{37}$ | 85 | 5 | 10 |
| 5 | —O($C_{18}H_{37}$—$C_{22}H_{45}$) | —O($C_{18}H_{37}$—$C_{22}H_{45}$) | + | — | 60–65 | 40 | 0 |
| 6 | —O($C_{18}H_{37}$—$C_{22}H_{45}$) | —O($C_{18}H_{37}$—$C_{22}H_{45}$) | + | —$C_{18}H_{37}$ | 68 | 2 | 30 |
| 7 | —O($C_{18}H_{37}$—$C_{22}H_{45}$) | —O($C_{18}H_{37}$—$C_{22}H_{45}$) | + | —$C_{18}H_{37}$ | 92 | 4 | 4 |

The reduction in the pour point of various crude oils by addition of various amounts of the compounds according to the invention is shown in Tables 5–8. The pour point was measured in accordance with ASTM standard No. 87B (section 6f).

Use example 1

TABLE 5

Reduction in the pour point of Asian crude oil

| Compound according to Example No. | Pour point (°C.) after addition of 0 ppm | 150 ppm | 250 ppm | 500 ppm |
|---|---|---|---|---|
| Tab. 3, No. 5 | 29 | 17 | 14 | 11 |
| 6 | 29 | 14 | 11 | 8 |
| 7 | 29 | 20 | 17 | 11 |
| 8 | 29 | 23 | 20 | 17 |
| 9 | 29 | 14 | 11 | 8 |
| Tab. 4, No. 5 | 29 | 20 | 17 | 14 |
| 6 | 29 | 17 | 14 | 11 |
| 7 | 29 | 14 | 14 | 8 |

Use example 2

TABLE 6

Reduction in the pour point of North Sea Oil I

| Compound according to Example No. | Pour point (°C.) after addition of 0 ppm | 150 ppm | 250 ppm |
|---|---|---|---|
| Tab. 3, No. 1 | 20 | 5 | −1 |
| 2 | 20 | 11 | 8 |
| 3 | 20 | 8 | 2 |
| 4 | 20 | 8 | 2 |
| 5 | 20 | −1 | −10 |
| 7 | 20 | −10 | −13 |
| 8 | 20 | −7 | −10 |
| 9 | 20 | −10 | −13 |
| Tab. 4, No. 1 | 20 | 2 | −10 |
| 2 | 20 | 5 | −2 |
| 3 | 20 | −7 | −13 |
| 4 | 20 | −1 | −10 |

Use example 3

TABLE 7

Reduction in the pour point of Northern Germany Oil I

| Compound according to Example No. of | Pour point (°C.) after addition 0 ppm | 80 ppm | 250 ppm | 500 ppm |
|---|---|---|---|---|
| Tab. 3, No. 6 | −9 | −21 | −30 | −39 |
| 9 | −9 | −18 | −27 | −36 |
| Tab. 4, No. 6 | −9 | −21 | −30 | −42 |

Use example 4

TABLE 8

Reduction in the pour point of North Sea Oil II

| Compound according to Example No. of | Pour point (°C.) after addition 0 ppm | 80 ppm | 150 ppm | 250 ppm |
|---|---|---|---|---|
| Tab. 3, No. 5 | 23 | 11 | 8 | 5 |

TABLE 8-continued

Reduction in the pour point of North Sea Oil II

| Compound according to Example No. of | Pour point (°C.) after addition 0 ppm | 80 ppm | 150 ppm | 250 ppm |
|---|---|---|---|---|
| 6 | 23 | 8 | 5 | 2 |
| 7 | 23 | 5 | 5 | 5 |
| 8 | 23 | 11 | 8 | 5 |
| 9 | 23 | 8 | 5 | 2 |
| Tab. 4, No. 4 | 23 | 11 | 2 | 2 |
| 5 | 23 | 11 | 5 | 2 |
| 6 | 23 | 8 | 5 | −3 |
| 7 | 23 | 5 | 2 | −7 |

Comparison examples

The following reductions in pour point were achieved with a copolymer according to U.S. Patent Specification 3,574,575 and maleic anhydride and styrene with subsequent reaction with behenyl alcohol:

| Crude oil | Pour point (°C.) after addition of 0 | 80 | 150 | 250 ppm |
|---|---|---|---|---|
| Asian | 29 | 29 | 26 | 23 |
| North Sea I | 20 | 17 | 17 | 11 |
| Northern Germany | −9 | −12 | −15 | −21 |
| North Sea II | 23 | 17 | 14 | 11 |

What is claimed is:

1. A copolymer based on maleic anhydride and a α, β-unsaturated compound, comprising the following bivalent-structural units, A. 20 to 95 mole percent of the structural element

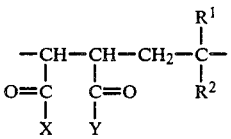

B. 0 to 40 mole percent of the structural element

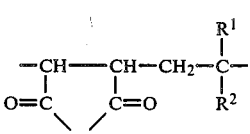

C. and 2 to 40 mole percent of the structural element

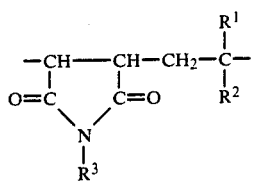

the sum of the mole percents of (A), (B) and (C) being 100, and wherein $R^1$ and $R^2$ are identical or different and denote hydrogen, straight chain or branched alkyl with 1 to 12 carbon atoms, unsubstituted or substituted aryl having 6 to 12 carbon atoms and wherein the substituents of the aryl are selected from $C_1$-to-$C_6$ alkyl, halogen, and $C_1$-to-$C_6$ alkoxy or the ester group $$-O\overset{O}{\underset{\|}{C}}-R^4$$

in which $R^4$ represents alkyl with 1 to 20 carbon atoms, $R^3$ denotes an alkyl with 1 to 20 carbon atoms, cycloalkyl with up to 20 carbon atoms, or unsubstituted or substituted aryl radical with up to 20 carbon atoms wherein the substituents of the aryl are selected from $C_1$-to-$C_6$ alkyl, halogen and $C_1$-to-$C_6$ alkoxy, and X and Y are identical or different and represent the group $$-O-R^5$$

in which $R^5$ denotes hydrogen, a cation or alkyl with 1 to 40 carbon atoms, or X and Y represent the group $$-NHR^3$$

in which $R^3$ has the above-mentioned meaning, at least one of the radicals in the radicals X and Y containing at least 18 carbon atoms.

2. Copolymers according to claim 1, characterized in that they contain, as bivalent structural units, A. 60 to 95 mole percent of the structural element

B. 0 to 25 mole percent of the structural element

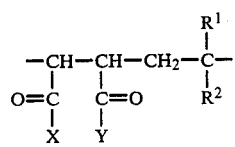

C. and 2 to 20 mole percent of the structural element

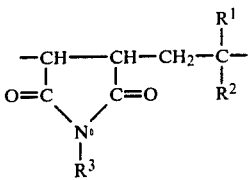

the sum of the mole percents of (A), (B) and (C) being 100, and wherein $R^1$ and $R^2$ are identical or different and denote hydrogen, alkyl with 1 to 6 carbon atoms, optionally substituted phenyl or the ester group $$-O\overset{O}{\underset{\|}{C}}-R^4$$

in which $R^4$ represents alkyl with 1 to 18 carbon atoms, $R^3$ denotes an alkyl radical with 1 to 20 carbon atoms, cyclopentyl or cyclohexyl, and X and Y are identical or different and represent the group $-OR^5$ in which $R^5$ denotes hydrogen or alkyl with 1 to 40 carbon atoms.

3. A copolymer according to claim 2 wherein

X is $-OR^5$ and, $R^5$ is an alkyl group of 1 to 40 carbon atoms.

4. A copolymer according to claim 3 wherein

Y is $-OR^5$ and $R^5$ is hydrogen.

5. A copolymer according to claim 3 wherein

Y is a moiety of the formula $-OR^5$ and $R^5$ is an alkyl group of 1 to 40 carbon atoms.

6. A copolymer according to claim 3 wherein

Y is a cation.

7. A copolymer according to claim 2 wherein

X and Y represent the group $-NHR^3$.

8. A composition comprising a mineral oil and a copolymer based on maleic anhydride and α, β-unsaturated compound having bivalent structural units as follows:

A. 20 to 95 mole percent of the structural element

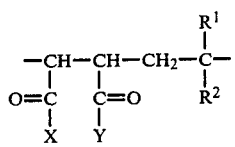

B. 0 to 40 mole percent of the structural element

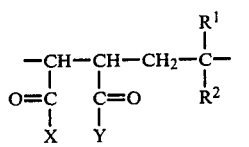

C. and 2 to 40 mole percent of the structural element

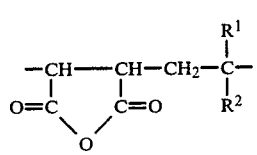

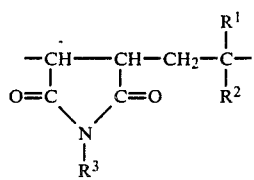

the sum of the mole percents of (A), (B) and (C) being 100, and wherein $R^1$ and $R^2$ are identical or different and denote hydrogen, straight chain or branched alkyl with 1 to 12 carbon atoms, unsubstituted or substituted aryl having 6 to 12 carbon atoms and wherein the substituents of the aryl are selected from $C_1$-to-$C_6$ alkyl, halogen, and $C_1$-to-$C_6$ alkoxy or the ester group

in which $R^4$ represents alkyl with 1 to 20 carbon atoms, $R^3$ denotes an alkyl with 1 to 20 carbon atoms, cycloalkyl with up to 20 carbon atoms, or unsubstituted or substituted aryl radical with up to 20 carbon atoms wherein the substituents of the aryl are selected from $C_1$-to-$C_6$ alkyl, halogen and $C_1$-to-$C_6$ alkoxy, and X and Y are identical or different and represent the group

in which $R^5$ denotes hydrogen, a cation or alkyl with 1 to 40 carbon atoms, or X and Y represent the group

in which $R^3$ has the above-mentioned meaning, and at least one of the radicals in the radicals X and Y containining at least 18 carbon atoms.

9. A composition according to claim 8 wherein said copolymer is present in an amount of 10 to 10,000 parts per million based on the weight of said mineral oil.

10. A composition according to claim 9 wherein said mineral oil is a paraffin containing mineral oil.

11. A composition according to claim 9 wherein said copolymer is one having bivalent structural units as follows:

A. 60 to 95 mole percent of the structural element

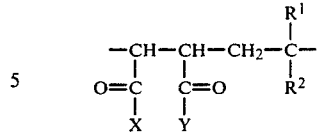

E. 0 to 25 mole percent of the structural element

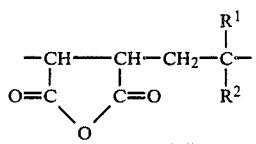

C. and 2 to 20 mole percent of the structural element

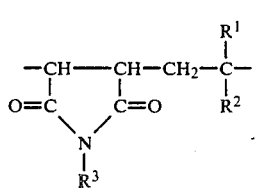

the sum of the mole percents of (A), (B), and (C) being 100, and wherein $R^1$ and $R^2$ are identical or different and denote hydrogen, alkyl with 1 to 6 carbon atoms, optionally substituted phenyl or the ester group

in which $R^4$ represents alkyl with 1 to 18 carbon atoms, $R^3$ denotes an alkyl radical with 1 to 20 carbon atoms, cyclopentyl or cyclohexyl, and X and Y are identical or different and represent the group

in which $R^5$ denotes hydrogen or alkyl with 1 to 40 carbon atoms.

12. A composition according to claim 11 wherein X is a moiety of the formula $-OR^5$ and $R^5$ is an alkyl group of 1 to 40 carbon atoms.

13. A composition according to claim 9 wherein $R^5$ is a straight or branched alkyl hydrocarbon of 14 to 40 carbon atoms.

14. A composition according to claim 13 wherein Y is a moiety of the formula $-OR^5$ and $R^5$ is hydrogen.

15. A composition according to claim 13 wherein Y is a moiety of the formula $-OR^5$ and $R^5$ is an alkyl group of 1 to 40 carbon atoms.

16. A composition according to claim 13 wherein Y is a cation.

* * * * *

UNITED STATES PATENT AND TRADEMARK OFFICE
CERTIFICATE OF CORRECTION

PATENT NO. : 4,670,516
DATED : June 2, 1987
INVENTOR(S) : Günter Sackmann, et al.

It is certified that error appears in the above-identified patent and that said Letters Patent is hereby corrected as shown below:

Col. 2, line 10     Delete "c." and substitute --C.--
Col. 4, line 52     Insert --Table 2--
Col. 4, line 55     Delete "B" and "$CR^3$" and substitute
                    --$\overset{B}{\text{--}}$-- --$\overset{C}{\text{--}}$-- and --$R^3$--

Col. 6, line 14     Delete "this" and substitute --the--

Col. 8, line 64     Delete "treated" and substitute --reacted--

Col. 16, line 9     Delete "E." and substitute --E.--

Signed and Sealed this

Twelfth Day of April, 1988

Attest:

DONALD J. QUIGG

*Attesting Officer*     *Commissioner of Patents and Trademarks*